United States Patent
Coquard et al.

(10) Patent No.: US 11,200,259 B2
(45) Date of Patent: *Dec. 14, 2021

(54) SYSTEM AND METHOD FOR PROCESSING CONTRACT DOCUMENTS

(71) Applicant: Ivalua S.A.S., Massy (FR)

(72) Inventors: Aurélien Coquard, Orsay (FR); Christopher Bourez, Paris (FR)

(73) Assignee: Ivalua S.A.S., Massy (FR)

(*) Notice: Subject to any disclaimer, the term of this patent is extended or adjusted under 35 U.S.C. 154(b) by 97 days.

This patent is subject to a terminal disclaimer.

(21) Appl. No.: 16/380,253

(22) Filed: Apr. 10, 2019

(65) Prior Publication Data

US 2020/0327151 A1 Oct. 15, 2020

(51) Int. Cl.
| | | |
|---|---|---|
| *G06F 16/30* | (2019.01) | |
| *G06F 16/28* | (2019.01) | |
| *G06F 16/93* | (2019.01) | |
| *G06F 40/205* | (2020.01) | |
| *G06F 40/263* | (2020.01) | |
| *G06F 40/289* | (2020.01) | |

(52) U.S. Cl.
CPC ............ *G06F 16/285* (2019.01); *G06F 16/93* (2019.01); *G06F 40/205* (2020.01); *G06F 40/263* (2020.01); *G06F 40/289* (2020.01)

(58) Field of Classification Search
CPC ...... G06F 16/93; G06F 16/285; G06F 16/906; G06F 40/205; G06F 40/263; G06F 40/289; G06F 16/3344; G06F 16/3347; G06F 16/9035; G06F 40/279; G06F 40/284; G06F 40/56; G06K 9/00469; G06K 9/00483; G06K 9/685; G06Q 50/18

See application file for complete search history.

(56) References Cited

U.S. PATENT DOCUMENTS

| | | |
|---|---|---|
| 8,543,576 B1 | 9/2013 | Buryak et al. |
| 10,162,850 B1 * | 12/2018 | Jain ..................... G06F 16/951 |
| 2006/0242098 A1 | 10/2006 | Wnek |
| 2008/0028293 A1 * | 1/2008 | Seliutin ................. G06F 16/93 |
| | | 715/234 |
| 2010/0332520 A1 | 12/2010 | Lu et al. |
| 2011/0202528 A1 | 8/2011 | Deolalikar et al. |

(Continued)

FOREIGN PATENT DOCUMENTS

JP 5383943 B1 * 1/2014

OTHER PUBLICATIONS

Machine Translation of JP 5383943B1, by Kaneko, Published on Jan. 8, 2014.*

(Continued)

*Primary Examiner* — Mahesh H Dwivedi
(74) *Attorney, Agent, or Firm* — EIP US LLP

(57) ABSTRACT

Provided is a system and method for processing contract documents. The method includes parsing a first contract document to identify a plurality of clauses in the first contract document, each clause of the plurality of clauses including a sequence of words, generating a plurality of representation vectors based on the first contract document and at least one embedding model, wherein each representation vector of the plurality of representation vectors is generated based on a separate clause of at least a subset of clauses of the plurality of clauses, comparing each representation vector of the plurality of representation vectors with a second plurality of representation vectors stored in a vector database, and generating output data based on the representation vectors and the first contract document.

21 Claims, 8 Drawing Sheets

(56) References Cited

U.S. PATENT DOCUMENTS

| | | | |
|---|---|---|---|
| 2013/0086470 A1* | 4/2013 | Dorr | G06F 40/284 |
| | | | 715/256 |
| 2013/0198596 A1* | 8/2013 | Angelillo | G06F 40/103 |
| | | | 715/205 |
| 2013/0275451 A1 | 10/2013 | Lewis et al. | |
| 2014/0053069 A1* | 2/2014 | Yan | G06Q 10/0635 |
| | | | 715/259 |
| 2016/0103823 A1* | 4/2016 | Jackson, Jr. | G06F 40/205 |
| | | | 704/9 |
| 2017/0098192 A1* | 4/2017 | Follis | G06Q 10/10 |
| 2017/0220545 A1 | 8/2017 | Gururajan et al. | |
| 2018/0144188 A1* | 5/2018 | Evanitsky | G06F 40/242 |
| 2019/0138571 A1* | 5/2019 | Dimerman | G06F 17/18 |
| 2019/0272421 A1* | 9/2019 | Sugaya | G06N 3/08 |
| 2019/0347284 A1* | 11/2019 | Roman | G06F 16/334 |
| 2020/0177373 A1* | 6/2020 | Komandur | H04L 9/0816 |
| 2020/0184584 A1* | 6/2020 | Farivar | G06N 3/08 |

OTHER PUBLICATIONS

Article entitled "Facebook Muse: A Python Library for Multilingual Word Embeddings now Open Sourced!", by Lahoti, dated Dec. 22, 2017.*

Article entitled "Contract Analysis Leveraging AI—A Technical Overview", by Bourez, dated May 15, 2019.*

Article entitled "Extracting Contract Elements", by Chalkidis et al., dated Jun. 16, 2017.*

Article entitled "Mining E-contract Documents to Classify Clauses", by Indukuri et al., dated Jan. 23, 2010.*

YouTube Video entitled "Introducing DeepK for Legal Contracts", by Nick, dated Mar. 16, 2018, available at https://www.youtube.com/watch?v=1pThrWPzlJQ (Year: 2018).*

YouTube Video entitled "The ICM NegotiateAI App—Optimize Negotiations with AI-Powered Insights", by Icertis, dated Jan. 14, 2019, available at https://www.youtube.com/watch?v=5Cs9y4cusZ8 (Year: 2019).*

Article entitled "Creating Contract Templates for Car Insurance Using Multi-agent Based Text Understanding and Clustering", by Minakov et al., 2007 (Year: 2007).

Article entitled "Legal Document Clustering with Built-in Topic Segmentation", by Lu et al., dated Oct. 28, 2011 (Year: 2011).

Article entitled "Measuring Compliance and Deviations in a Template-Based Service Contract Development Process", by Chenthamarakshan et al., 2010 IEEE International Conference on Services Computing (Year: 2010).

Non Final Office Action dated Aug. 9, 2021 for U.S. Appl. No. 16/906,855.

* cited by examiner

SYSTEM AND METHOD FOR PROCESSING CONTRACT DOCUMENTS

BACKGROUND

1. Field

This disclosure relates generally to document processing and, in non-limiting embodiments, systems and methods for processing contract documents.

2. Technical Considerations

The field of machine reading comprehension (MRC) allows for numerous applications, such as sourcing, trend analysis, conversational agents, sentiment analysis, document management, cross-language business development, and the like. The data analyzed for such applications include natural language, which is rarely in structured form. The data may include any form of human communication, such as live conversations (e.g., chatbots, emails, speech-to-text applications, audio recordings, etc.) in addition to documents and writings stored in databases.

With respect to contract and legal data, several technical problems arise in the field of MRC. While users of such data need to analyze the data to manage risk, apply risk policies, ensure accuracy of parameters, and the like, the vast amount of data makes this review impractical, complicated, and prone to errors. Attempts to address this problem include templates and standardized clauses, although the contract documents at issue typically include a large amount of wild texts that have been modified from templates through the removal or alteration of clauses, specific conditions, inputs from third parties during negotiation, and/or the like.

Using machine learning and artificial intelligence techniques with such data presents additional technical problems. For example, the amount of available data is too limited to train an algorithm, which usually requires millions of data points, because a large amount of legal data is not publicly available due to confidentiality requirements. Another technical problem is that legal language is much different than common, conversational language, and trained language algorithms based on typical language and writings may not be accurate for contract documents and other legal documents.

SUMMARY

According to non-limiting embodiments or aspects, provided is a computer-implemented method for processing a plurality of contract documents having different formats and clauses, comprising: parsing, with at least one processor, a first contract document to identify a plurality of clauses in the first contract document, each clause of the plurality of clauses comprising a sequence of words; generating, with at least one processor, a plurality of representation vectors based on the first contract document and at least one embedding model, wherein each representation vector of the plurality of representation vectors is generated based on a separate clause of at least a subset of clauses of the plurality of clauses; comparing, with at least one processor, each representation vector of the plurality of representation vectors with a second plurality of representation vectors stored in a vector database; and generating, with at least one processor, output data based on the representation vectors and the first contract document.

In non-limiting embodiments or aspects, the second plurality of representation vectors is unclassified, and the method further comprises: detecting, with at least one processor, a parameter in a clause of the plurality of clauses that differs by more than a threshold from at least one other parameter in at least one other clause corresponding to a representation vector clustered with a representation vector corresponding to the clause, the output data comprising at least one of the following: a new parameter replacing the parameter, a new clause replacing the clause, an annotation identifying the parameter, an annotation identifying the clause, risk assessment data based on the parameter, or any combination thereof. In non-limiting embodiments or aspects, the method further comprises: identifying, with at least one processor, a plurality of parameters in the first contract document that corresponds to a plurality of predetermined fields based on comparing clauses corresponding to representation vectors clustered together, the output data comprises at least one of the following: at least one data structure representing the plurality of parameters from the first contract document, a structured contract document based on the first contract document and comprising merge fields corresponding to the plurality of predetermined fields, or any combination thereof.

In non-limiting embodiments or aspects, the output data comprises the at least one data structure representing the plurality of parameters, the method further comprising: storing the output data as metadata associated with the first contract document; detecting, with at least one processor, a modification to the first contract document; and in response to detecting the modification, automatically updating the metadata associated with the first contract document based on the modification. In non-limiting embodiments or aspects, the method further comprises: determining, with at least one processor, a classification for each clause of the plurality of clauses based on a classification associated with at least one other clause corresponding to at least one representation vector clustered with a representation vector corresponding to the clause, wherein each classification corresponds to a clause category.

In non-limiting embodiments or aspects, generating each representation vector comprises determining at least one sentence embedding in a corresponding clause based on the at least one embedding model, wherein each sentence embedding is based on a sequence of word embeddings. In non-limiting embodiments or aspects, clustering each representation vector comprises determining a distance between the representation vector and at least one representation vector of the second plurality of representation vectors. In non-limiting embodiments or aspects, generating each representation vector comprises: detecting a first language of a clause of the first contract document; and generating at least one cross-lingual or multilingual embedding for the clause based on a linguistics embedding model. In non-limiting embodiments or aspects, the method further comprises parsing, with at least one processor, the first contract document to identify a plurality of clause titles, the plurality of clause titles independent of the plurality of clauses.

In non-limiting embodiments or aspects, identifying the plurality of clauses is based on identifying the plurality of clause titles. In non-limiting embodiments or aspects, the method further comprises: generating, with at least one processor, a plurality of title representation vectors based on the plurality of clause titles, wherein each title representation vector of the plurality of title representation vectors is generated based on a separate clause title in the first contract document; clustering, with at least one processor, each title representation vector of the plurality of title representation vectors with a second plurality of title representation vectors stored in the vector database; and verifying, with at least one processor, the clustering of the plurality of representation vectors corresponding to the plurality of clauses based on comparing clusters for the plurality of representation vectors to clusters for the plurality of title representation vectors. In non-limiting embodiments or aspects, the method further comprises determining, with at least one processor, that a clause of the plurality of clauses lacks a corresponding title or corresponds to an incorrect title, the output data comprises a new title for the clause based on at least one title associated with at least one other clause corresponding to at least one representation vector clustered with a representation vector corresponding to the clause.

In non-limiting embodiments or aspects, the output data comprises an annotated version of the first contract document. In non-limiting embodiments or aspects, the output data comprises a summary of the first contract document. In non-limiting embodiments or aspects, the output data comprises a second contract document generated based on a predetermined template. In non-limiting embodiments or aspects, the output data comprises a second contract document including at least one new clause replacing at least one clause of the plurality of clauses. In non-limiting embodiments or aspects, the output data comprises a second contract document, and wherein generating the second contract document comprises determining a counter-proposal to at least one clause of the plurality of clauses based on a contract database comprising a plurality of contract documents.

According to non-limiting embodiments or aspects, provided is a system for processing a plurality of contract documents having different formats and clauses, comprising at least one processor programmed or configured to: parse a first contract document to identify a plurality of clauses in the first contract document, each clause of the plurality of clauses comprising a sequence of words; generate a plurality of representation vectors based on the first contract document and at least one embedding model, wherein each representation vector of the plurality of representation vectors is generated based on a separate clause of at least a subset of clauses of the plurality of clauses; compare each representation vector of the plurality of representation vectors with a second plurality of representation vectors stored in a vector database; and generate output data based on the representation vectors and the first contract document.

In non-limiting embodiments or aspects, the second plurality of representation vectors is unclassified, and the at least one processor is further programmed or configured to detect a parameter in a clause of the plurality of clauses that differs by more than a threshold from at least one other parameter in at least one other clause corresponding to a representation vector clustered with a representation vector corresponding to the clause, the output data comprises at least one of the following: a new parameter replacing the parameter, a new clause replacing the clause, an annotation identifying the parameter, an annotation identifying the clause, risk assessment data based on the parameter, or any combination thereof. In non-limiting embodiments or aspects, the at least one processor is further programmed or configured to identify a plurality of parameters in the first contract document that corresponds to a plurality of predetermined fields based on comparing clauses corresponding to representation vectors clustered together, the output data comprising at least one of the following: at least one data structure representing the plurality of parameters from the first contract document, a structured contract document based on the first contract document and comprising merge fields corresponding to the plurality of predetermined fields, or any combination thereof.

In non-limiting embodiments or aspects, the output data comprises the at least one data structure representing the plurality of parameters, and the at least one processor is further programmed or configured to: store the output data as metadata associated with the first contract document; detect a modification to the first contract document; and in response to detecting the modification, automatically update the metadata associated with the first contract document based on the modification. In non-limiting embodiments or aspects, the at least one processor is further programmed or configured to determine a classification for each clause of the plurality of clauses based on a classification associated with at least one other clause corresponding to at least one representation vector clustered with a representation vector corresponding to the clause, wherein each classification corresponds to a clause category.

In non-limiting embodiments or aspects, generating each representation vector comprises determining at least one sentence embedding in a corresponding clause based on the at least one embedding model, wherein each sentence embedding is based on a sequence of word embeddings. In non-limiting embodiments or aspects, clustering each representation vector comprises determining a distance between the representation vector and at least one representation vector of the second plurality of representation vectors. In non-limiting embodiments or aspects, generating each representation vector comprises: detecting a first language of a clause of the first contract document and generating at least one cross-lingual or multilingual embedding for the clause based on a linguistics embedding model.

In non-limiting embodiments or aspects, the at least one processor is further programmed or configured to parse the first contract document to identify a plurality of clause titles, wherein the plurality of clause titles is independent of the plurality of clauses. In non-limiting embodiments or aspects, identifying the plurality of clauses is based on identifying the plurality of clause titles. In non-limiting embodiments or aspects, the at least one processor is further programmed or configured to: generate a plurality of title representation vectors based on the plurality of clause titles, wherein each title representation vector of the plurality of title representation vectors is generated based on a separate clause title in the first contract document; cluster each title representation vector of the plurality of title representation vectors with a second plurality of title representation vectors stored in the vector database; and verify the clustering of the plurality of representation vectors corresponding to the plurality of clauses based on comparing clusters for the plurality of representation vectors to clusters for the plurality of title representation vectors. In non-limiting embodiments or aspects, the at least one processor is further programmed or configured to determine that a clause of the plurality of clauses lacks a corresponding title or corresponds to an incorrect title, the output data comprising a new title for the clause based on at least one title associated with at least one other clause corresponding to at least one representation vector clustered with a representation vector corresponding to the clause.

In non-limiting embodiments or aspects, the output data comprises an annotated version of the first contract document. In non-limiting embodiments or aspects, the output data comprises a summary of the first contract document. In non-limiting embodiments or aspects, the output data comprises a second contract document generated based on a predetermined template. In non-limiting embodiments or aspects, the output data comprises a second contract document including at least one new clause replacing at least one clause of the plurality of clauses. In non-limiting embodiments or aspects, the output data comprises a second contract document, wherein generating the second contract document comprises determining a counter-proposal to at least one clause of the plurality of clauses based on a contract database comprising a plurality of contract documents.

According to non-limiting embodiments or aspects, provided is a computer program product for processing a plurality of contract documents having different formats and clauses, comprising at least one non-transitory computer-readable medium including program instructions that, when executed by at least one processor, cause the at least one processor to: parse a first contract document to identify a plurality of clauses in the first contract document, each clause of the plurality of clauses comprising a sequence of words; generate a plurality of representation vectors based on the first contract document and at least one embedding model, wherein each representation vector of the plurality of representation vectors is generated based on a separate clause of at least a subset of clauses of the plurality of clauses; compare each representation vector of the plurality of representation vectors with a second plurality of representation vectors stored in a vector database; and generate output data based on the representation vectors and the first contract document.

In non-limiting embodiments or aspects, the second plurality of representation vectors is unclassified, and the program instructions further cause the at least one processor to detect a parameter in a clause of the plurality of clauses that differs by more than a threshold from at least one other parameter in at least one other clause corresponding to a representation vector clustered with a representation vector corresponding to the clause, the output data comprising at least one of the following: a new parameter replacing the parameter, a new clause replacing the clause, an annotation identifying the parameter, an annotation identifying the clause, risk assessment data based on the parameter, or any combination thereof. In non-limiting embodiments or aspects, the program instructions further cause the at least one processor to identify a plurality of parameters in the first contract document that correspond to a plurality of predetermined fields based on comparing clauses corresponding to representation vectors clustered together, the output data comprising at least one of the following: at least one data structure representing the plurality of parameters from the first contract document, a structured contract document based on the first contract document and comprising merge fields corresponding to the plurality of predetermined fields, or any combination thereof.

In non-limiting embodiments or aspects, the output data comprises the at least one data structure representing the plurality of parameters, and the program instructions further cause the at least one processor to: store the output data as metadata associated with the first contract document; detect a modification to the first contract document; and in response to detecting the modification, automatically update the metadata associated with the first contract document based on the modification. In non-limiting embodiments or aspects, the program instructions further cause the at least one processor to determine a classification for each clause of the plurality of clauses based on a classification associated with at least one other clause corresponding to at least one representation vector clustered with a representation vector corresponding to the clause, wherein each classification corresponds to a clause category.

In non-limiting embodiments or aspects, generating each representation vector comprises determining at least one sentence embedding in a corresponding clause based on the at least one embedding model, wherein each sentence embedding is based on a sequence of word embeddings. In non-limiting embodiments or aspects, clustering each representation vector comprises determining a distance between the representation vector and at least one representation vector of the second plurality of representation vectors. In non-limiting embodiments or aspects, generating each representation vector comprises: detecting a first language of a clause of the first contract document and generating at least one cross-lingual or multilingual embedding for the clause based on a linguistics embedding model.

In non-limiting embodiments or aspects, the program instructions further cause the at least one processor to parse the first contract document to identify a plurality of clause titles, the plurality of clause titles is independent of the plurality of clauses. In non-limiting embodiments or aspects, identifying the plurality of clauses is based on identifying the plurality of clause titles. In non-limiting embodiments or aspects, the program instructions further cause the at least one processor to: generate a plurality of title representation vectors based on the plurality of clause titles, wherein each title representation vector of the plurality of title representation vectors is generated based on a separate clause title in the first contract document; cluster each title representation vector of the plurality of title representation vectors with a second plurality of title representation vectors stored in the vector database; and verify the clustering of the plurality of representation vectors corresponding to the plurality of clauses based on comparing clusters for the plurality of representation vectors to clusters for the plurality of title representation vectors. In non-limiting embodiments or aspects, the program instructions further cause the at least one processor to determine that a clause of the plurality of clauses lacks a corresponding title or corresponds to an incorrect title, the output data comprising a new title for the clause based on at least one title associated with at least one other clause corresponding to at least one representation vector clustered with a representation vector corresponding to the clause.

In non-limiting embodiments or aspects, the output data comprises an annotated version of the first contract document. In non-limiting embodiments or aspects, the output data comprises a summary of the first contract document. In non-limiting embodiments or aspects, the output data comprises a second contract document generated based on a predetermined template. In non-limiting embodiments or aspects, the output data comprises a second contract document including at least one new clause replacing at least one clause of the plurality of clauses. In non-limiting embodiments or aspects, the output data comprises a second contract document, wherein generating the second contract document comprises determining a counter-proposal to at least one clause of the plurality of clauses based on a contract database comprising a plurality of contract documents.

Other non-limiting embodiments or aspects will be set forth in the following numbered clauses:

Clause 1: A computer-implemented method for processing a plurality of contract documents having different formats and clauses, comprising: parsing, with at least one processor, a first contract document to identify a plurality of clauses in the first contract document, each clause of the plurality of clauses comprising a sequence of words; generating, with at least one processor, a plurality of representation vectors based on the first contract document and at least one embedding model, wherein each representation vector of the plurality of representation vectors is generated based on a separate clause of at least a subset of clauses of the plurality of clauses; comparing, with at least one processor, each representation vector of the plurality of representation vectors with a second plurality of representation vectors stored in a vector database; and generating, with at least one processor, output data based on the representation vectors and the first contract document.

Clause 2: The computer-implemented method of clause 1, wherein the second plurality of representation vectors is unclassified, the method further comprising: detecting, with at least one processor, a parameter in a clause of the plurality of clauses that differs by more than a threshold from at least one other parameter in at least one other clause corresponding to a representation vector clustered with a representation vector corresponding to the clause, wherein the output data comprises at least one of the following: a new parameter replacing the parameter, a new clause replacing the clause, an annotation identifying the parameter, an annotation identifying the clause, risk assessment data based on the parameter, or any combination thereof.

Clause 3: The computer-implemented method of clauses 1 or 2, further comprising: identifying, with at least one processor, a plurality of parameters in the first contract document that corresponds to a plurality of predetermined fields based on comparing clauses corresponding to representation vectors clustered together, wherein the output data comprises at least one of the following: at least one data structure representing the plurality of parameters from the first contract document, a structured contract document based on the first contract document and comprising merge fields corresponding to the plurality of predetermined fields, or any combination thereof.

Clause 4: The computer-implemented method of any of clauses 1-3, wherein the output data comprises the at least one data structure representing the plurality of parameters, further comprising: storing the output data as metadata associated with the first contract document; detecting, with at least one processor, a modification to the first contract document; and in response to detecting the modification, automatically updating the metadata associated with the first contract document based on the modification.

Clause 5: The computer-implemented method of any of clauses 1-4, further comprising: determining, with at least one processor, a classification for each clause of the plurality of clauses based on a classification associated with at least one other clause corresponding to at least one representation vector clustered with a representation vector corresponding to the clause, wherein each classification corresponds to a clause category.

Clause 6: The computer-implemented method of any of clauses 1-5, wherein generating each representation vector comprises determining at least one sentence embedding in a corresponding clause based on the at least one embedding model, wherein each sentence embedding is based on a sequence of word embeddings.

Clause 7: The computer-implemented method of any of clauses 1-6, wherein clustering each representation vector comprises determining a distance between the representation vector and at least one representation vector of the second plurality of representation vectors.

Clause 8: The computer-implemented method of any of clauses 1-7, wherein generating each representation vector comprises: detecting a first language of a clause of the first contract document; and generating at least one cross-lingual or multilingual embedding for the clause based on a linguistics embedding model.

Clause 9: The computer-implemented method of any of clauses 1-8, further comprising parsing, with at least one processor, the first contract document to identify a plurality of clause titles, wherein the plurality of clause titles is independent of the plurality of clauses.

Clause 10: The computer-implemented method of any of clauses 1-9, wherein identifying the plurality of clauses is based on identifying the plurality of clause titles.

Clause 11: The computer-implemented method of any of clauses 1-10, further comprising: generating, with at least one processor, a plurality of title representation vectors based on the plurality of clause titles, wherein each title representation vector of the plurality of title representation vectors is generated based on a separate clause title in the first contract document; clustering, with at least one processor, each title representation vector of the plurality of title representation vectors with a second plurality of title representation vectors stored in the vector database; and verifying, with at least one processor, the clustering of the plurality of representation vectors corresponding to the plurality of clauses based on comparing clusters for the plurality of representation vectors to clusters for the plurality of title representation vectors.

Clause 12: The computer-implemented method of any of clauses 1-11, further comprising determining, with at least one processor, that a clause of the plurality of clauses lacks a corresponding title or corresponds to an incorrect title, wherein the output data comprises a new title for the clause based on at least one title associated with at least one other clause corresponding to at least one representation vector clustered with a representation vector corresponding to the clause.

Clause 13: The computer-implemented method of any of clauses 1-12, wherein the output data comprises an annotated version of the first contract document.

Clause 14: The computer-implemented method of any of clauses 1-13, wherein the output data comprises a summary of the first contract document.

Clause 15: The computer-implemented method of any of clauses 1-14, wherein the output data comprises a second contract document generated based on a predetermined template.

Clause 16: The computer-implemented method of any of clauses 1-15, wherein the output data comprises a second contract document including at least one new clause replacing at least one clause of the plurality of clauses.

Clause 17: The computer-implemented method of any of clauses 1-16, wherein the output data comprises a second contract document, and wherein generating the second contract document comprises determining a counter-proposal to at least one clause of the plurality of clauses based on a contract database comprising a plurality of contract documents.

Clause 18: A system for processing a plurality of contract documents having different formats and clauses, comprising at least one processor programmed or configured to: parse a first contract document to identify a plurality of clauses in the first contract document, each clause of the plurality of clauses comprising a sequence of words; generate a plurality of representation vectors based on the first contract document and at least one embedding model, wherein each representation vector of the plurality of representation vectors is generated based on a separate clause of at least a subset of clauses of the plurality of clauses; compare each representation vector of the plurality of representation vectors with a second plurality of representation vectors stored in a vector database; and generate output data based on the representation vectors and the first contract document.

Clause 19: The system of clause 18, wherein the second plurality of representation vectors is unclassified, and wherein the at least one processor is further programmed or configured to detect a parameter in a clause of the plurality of clauses that differs by more than a threshold from at least one other parameter in at least one other clause corresponding to a representation vector clustered with a representation vector corresponding to the clause, wherein the output data comprises at least one of the following: a new parameter replacing the parameter, a new clause replacing the clause, an annotation identifying the parameter, an annotation identifying the clause, risk assessment data based on the parameter, or any combination thereof.

Clause 20: The system of clauses 18 or 19, wherein the at least one processor is further programmed or configured to identify a plurality of parameters in the first contract document that corresponds to a plurality of predetermined fields based on comparing clauses corresponding to representation vectors clustered together, wherein the output data comprises at least one of the following: at least one data structure representing the plurality of parameters from the first contract document, a structured contract document based on the first contract document and comprising merge fields corresponding to the plurality of predetermined fields, or any combination thereof.

Clause 21: The system of any of clauses 18-20, wherein the output data comprises the at least one data structure representing the plurality of parameters, and wherein the at least one processor is further programmed or configured to: store the output data as metadata associated with the first contract document; detect a modification to the first contract document; and in response to detecting the modification, automatically update the metadata associated with the first contract document based on the modification.

Clause 22: The system of any of clauses 18-21, wherein the at least one processor is further programmed or configured to determine a classification for each clause of the plurality of clauses based on a classification associated with at least one other clause corresponding to at least one representation vector clustered with a representation vector corresponding to the clause, wherein each classification corresponds to a clause category.

Clause 23: The system of any of clauses 18-22, wherein generating each representation vector comprises determining at least one sentence embedding in a corresponding clause based on the at least one embedding model, wherein each sentence embedding is based on a sequence of word embeddings.

Clause 24: The system of any of clauses 18-23, wherein clustering each representation vector comprises determining a distance between the representation vector and at least one representation vector of the second plurality of representation vectors.

Clause 25: The system of any of clauses 18-24, wherein generating each representation vector comprises: detecting a first language of a clause of the first contract document; and generating at least one cross-lingual or multilingual embedding for the clause based on a linguistics embedding model.

Clause 26: The system of any of clauses 18-25, wherein the at least one processor is further programmed or configured to parse the first contract document to identify a plurality of clause titles, wherein the plurality of clause titles is independent of the plurality of clauses.

Clause 27: The system of any of clauses 18-26, wherein identifying the plurality of clauses is based on identifying the plurality of clause titles.

Clause 28: The system of any of clauses 18-27, wherein the at least one processor is further programmed or configured to: generate a plurality of title representation vectors based on the plurality of clause titles, wherein each title representation vector of the plurality of title representation vectors is generated based on a separate clause title in the first contract document; cluster each title representation vector of the plurality of title representation vectors with a second plurality of title representation vectors stored in the vector database; and verify the clustering of the plurality of representation vectors corresponding to the plurality of clauses based on comparing clusters for the plurality of representation vectors to clusters for the plurality of title representation vectors.

Clause 29: The system of any of clauses 18-28, wherein the at least one processor is further programmed or configured to determine that a clause of the plurality of clauses lacks a corresponding title or corresponds to an incorrect title, wherein the output data comprises a new title for the clause based on at least one title associated with at least one other clause corresponding to at least one representation vector clustered with a representation vector corresponding to the clause.

Clause 30: The system of any of clauses 18-29, wherein the output data comprises an annotated version of the first contract document.

Clause 31: The system of any of clauses 18-30, wherein the output data comprises a summary of the first contract document.

Clause 32: The system of any of clauses 18-31, wherein the output data comprises a second contract document generated based on a predetermined template.

Clause 33: The system of any of clauses 18-32, wherein the output data comprises a second contract document including at least one new clause replacing at least one clause of the plurality of clauses.

Clause 34: The system of any of clauses 18-33, wherein the output data comprises a second contract document, and wherein generating the second contract document comprises determining a counter-proposal to at least one clause of the plurality of clauses based on a contract database comprising a plurality of contract documents.

Clause 35: A computer program product for processing a plurality of contract documents having different formats and clauses, comprising at least one non-transitory computer-readable medium including program instructions that, when executed by at least one processor, cause the at least one processor to: parse a first contract document to identify a plurality of clauses in the first contract document, each clause of the plurality of clauses comprising a sequence of words; generate a plurality of representation vectors based on the first contract document and at least one embedding model, wherein each representation vector of the plurality of representation vectors is generated based on a separate clause of at least a subset of clauses of the plurality of clauses; compare each representation vector of the plurality of representation vectors with a second plurality of representation vectors stored in a vector database; and generate output data based on the representation vectors and the first contract document.

Clause 36: The computer program product of clause 35, wherein the second plurality of representation vectors is unclassified, and wherein the program instructions further cause the at least one processor to detect a parameter in a clause of the plurality of clauses that differs by more than a threshold from at least one other parameter in at least one other clause corresponding to a representation vector clustered with a representation vector corresponding to the clause, wherein the output data comprises at least one of the following: a new parameter replacing the parameter, a new clause replacing the clause, an annotation identifying the parameter, an annotation identifying the clause, risk assessment data based on the parameter, or any combination thereof.

Clause 37: The computer program product of clauses 35 or 36, wherein the program instructions further cause the at least one processor to identify a plurality of parameters in the first contract document that correspond to a plurality of predetermined fields based on comparing clauses corresponding to representation vectors clustered together, wherein the output data comprises at least one of the following: at least one data structure representing the plurality of parameters from the first contract document, a structured contract document based on the first contract document and comprising merge fields corresponding to the plurality of predetermined fields, or any combination thereof.

Clause 38: The computer program product of any of clauses 35-37, wherein the output data comprises the at least one data structure representing the plurality of parameters, and wherein the program instructions further cause the at least one processor to: store the output data as metadata associated with the first contract document; detect a modification to the first contract document; and in response to detecting the modification, automatically update the metadata associated with the first contract document based on the modification.

Clause 39: The computer program product of any of clauses 35-38, wherein the program instructions further cause the at least one processor to determine a classification for each clause of the plurality of clauses based on a classification associated with at least one other clause corresponding to at least one representation vector clustered with a representation vector corresponding to the clause, wherein each classification corresponds to a clause category.

Clause 40: The computer program product of any of clauses 35-39, wherein generating each representation vector comprises determining at least one sentence embedding in a corresponding clause based on the at least one embedding model, wherein each sentence embedding is based on a sequence of word embeddings.

Clause 41: The computer program product of any of clauses 35-40, wherein clustering each representation vector comprises determining a distance between the representation vector and at least one representation vector of the second plurality of representation vectors.

Clause 42: The computer program product of any of clauses 35-41, wherein generating each representation vector comprises: detecting a first language of a clause of the first contract document; and generating at least one cross-lingual or multilingual embedding for the clause based on a linguistics embedding model.

Clause 43: The computer program product of any of clauses 35-42, wherein the program instructions further cause the at least one processor to parse the first contract document to identify a plurality of clause titles, wherein the plurality of clause titles is independent of the plurality of clauses.

Clause 44: The computer program product of any of clauses 35-43, wherein identifying the plurality of clauses is based on identifying the plurality of clause titles.

Clause 45: The computer program product of any of clauses 35-44, wherein the program instructions further cause the at least one processor to: generate a plurality of title representation vectors based on the plurality of clause titles, wherein each title representation vector of the plurality of title representation vectors is generated based on a separate clause title in the first contract document; cluster each title representation vector of the plurality of title representation vectors with a second plurality of title representation vectors stored in the vector database; and verify the clustering of the plurality of representation vectors corresponding to the plurality of clauses based on comparing clusters for the plurality of representation vectors to clusters for the plurality of title representation vectors.

Clause 46: The computer program product of any of clauses 35-45, wherein the program instructions further cause the at least one processor to determine that a clause of the plurality of clauses lacks a corresponding title or corresponds to an incorrect title, wherein the output data comprises a new title for the clause based on at least one title associated with at least one other clause corresponding to at least one representation vector clustered with a representation vector corresponding to the clause.

Clause 47: The computer program product of any of clauses 35-46, wherein the output data comprises an annotated version of the first contract document.

Clause 48: The computer program product of any of clauses 35-47, wherein the output data comprises a summary of the first contract document.

Clause 49: The computer program product of any of clauses 35-48, wherein the output data comprises a second contract document generated based on a predetermined template.

Clause 50: The computer program product of any of clauses 35-49, wherein the output data comprises a second contract document including at least one new clause replacing at least one clause of the plurality of clauses.

Clause 51: The computer program product of any of clauses 35-50, wherein the output data comprises a second contract document, and wherein generating the second contract document comprises determining a counter-proposal to at least one clause of the plurality of clauses based on a contract database comprising a plurality of contract documents.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION OF THE PREFERRED EMBODIMENTS

Figure 1:
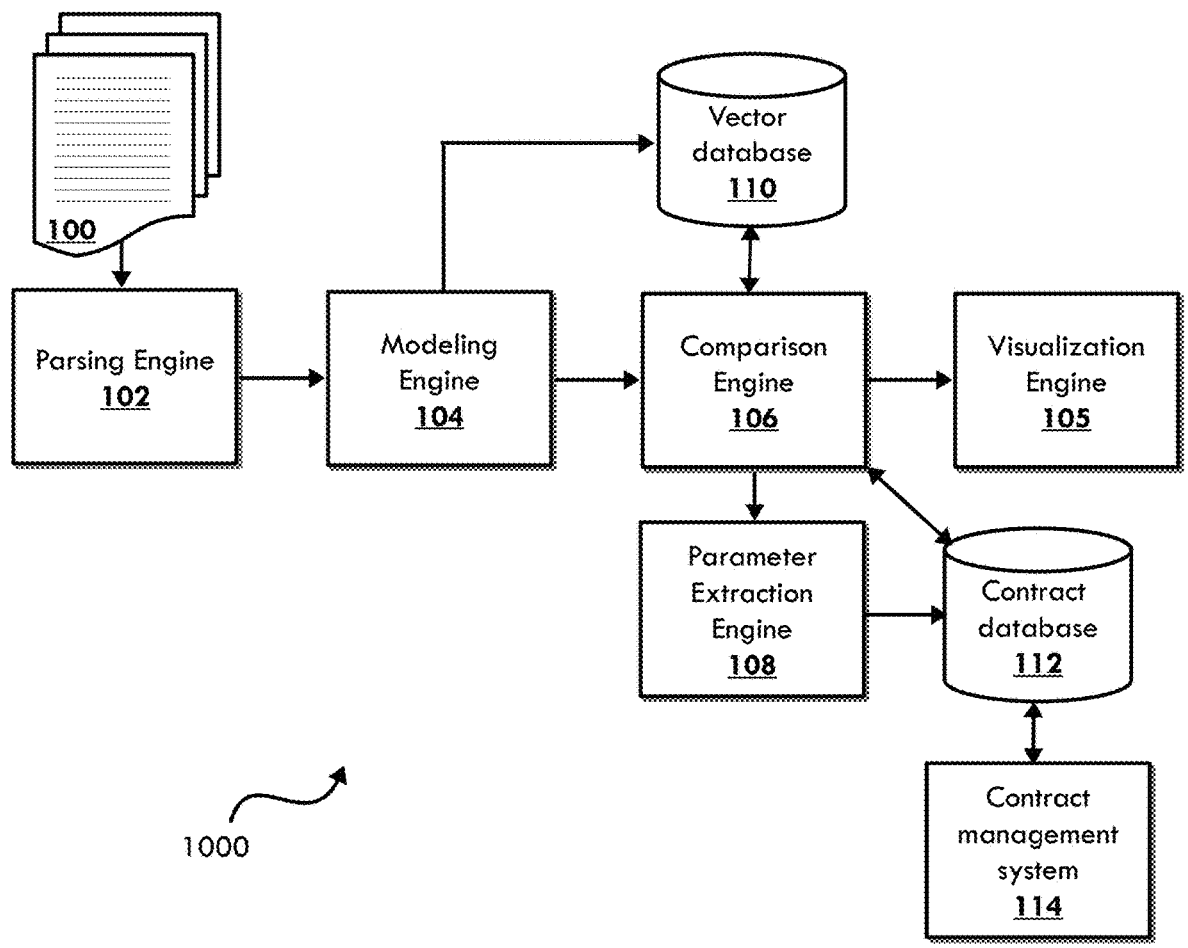
FIG. 1 is a schematic diagram of a system for processing contract documents according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a display, a processor, a memory, an input device, and a network interface. A computing device may be a server, a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices.

As used herein, the term "Application Programming Interface" (API) refers to computer code or other data stored on a computer-readable medium that may be executed by a processor to facilitate the interaction between software components, such as a client-side front-end and/or server-side back-end for receiving data from the client.

As used herein, the term "graphical user interface" or "GUI" refers to a generated display with which a user may interact, either directly or indirectly (e.g., through a keyboard, mouse, touchscreen, and/or the like).

As used herein, the term "engine" may refer to hardware and/or software such as, for example, one or more software applications, portions of software applications, software functions, configured processors, circuits, and/or the like.

Non-limiting embodiments of a system and method for processing contract documents allow for an analysis of contract documents based on unlabeled (e.g., unclassified) contract data. By analyzing contract documents by clauses and sentence embeddings corresponding to clauses, contract documents may be efficiently analyzed and compared to other clauses of other contract documents without being formatted in a particular way or according to a template. Moreover, non-limiting embodiments of a system and method for processing contract documents also allow for an analysis of contract documents based on labeled (e.g., classified) contract data. The unique arrangement and configuration of non-limiting embodiments allow for numerous beneficial results, including the generation of contract summaries and annotated contract documents, extraction of parameters, real-time management of metadata, and other like outputs. Further, non-limiting embodiments allow for the processing of contract documents that are in various formats, with or without fields, and in different languages. Additional technical benefits are provided as explained herein. Non-limiting embodiments may be utilized in any domain and for any type of contract document, such as a contract for the sale of goods, a license, a service level agreement, and/or the like.

FIG. 1 depicts a system 1000 for processing contract documents according to a non-limiting embodiment. The system 1000 includes a parsing engine 102, modeling engine 104, comparison engine 106, and parameter extraction engine 108. In some examples, the parsing engine 102, modeling engine 104, comparison engine 106, and parameter extraction engine 108 may all be functions or portions of a single software application. In other non-limiting embodiments, one or more of the parsing engine 102, modeling engine 104, comparison engine 106, and parameter extraction engine 108 may be distributed and/or separate components, such as separate applications and/or computing devices. A contract document 100 may be input into the parsing engine 102 to be processed. In some examples, a front-end GUI (not shown in FIG. 1) may be used to select a contract document 100 from a local or network location and to input the contract document to the parsing engine 102. In some examples, an API may be used to communicate a contract document 100 to the parsing engine 102 for processing.

With continued reference to FIG. 1, the system 1000 also includes a vector database 110 and a contract database 112. The vector database 110 includes a plurality of representation vectors corresponding to a plurality of existing clauses and contract documents. For example, the vector database 110 may be generated by inputting a plurality of contract documents including classified and/or unclassified clauses to the modeling engine 104. Words, sentences, and clauses may be detected in the contract documents and converted into representation vectors for individual clauses in each contract document. The representation vectors are stored in the vector database 110 which may increase in size over time as more contract documents are processed by the system 1000. The contract database 112 may include a collection of contract documents, including contract documents processed by the system 1000 and/or contract documents imported from other sources. A contract management system 114 may include a separate software application and/or computing device for managing contract documents.

Still referring to FIG. 1, the parsing engine 102 may be configured to parse the contract document 100 to detect words, sentences, and clauses. A word is one or more characters and a sentence is a sequence of words. A clause includes one or more sentences grouped together and set apart from other sentences, or that are intended to be separate from other sentences, in a contract document. For example, a clause may include a paragraph, one or more off-set sentences, one or more sentences separated by a delimiter or title (e.g., heading), and/or the like. The parsing engine 102 may output one or more data structures that include one or more clauses from the inputted contract document 100. For example, the parsing engine 102 may output textual data with delimiters separating the different clauses and/or clause titles, an array of textual elements representing different clauses and/or clause titles, and/or the like.

With continued reference to FIG. 1, the modeling engine 104 may be configured to generate a representation vector from a clause. In the depicted example, the modeling engine 104 receives structured contract document data from the parsing engine 102. The modeling engine 104 processes the clauses separately to generate a representation vector for each clause. A representation vector for a clause may be any number of dimensions and may be based on a sequence of word embeddings and/or a sequence of sentence embeddings. In non-limiting examples, the modeling engine 104 employs an embedding model that is generated from processing textual documents including, but not limited to, a plurality of contract documents, news articles, webpages, and/or any other like text. The model may be a neural network that is trained from such training texts. In some non-limiting embodiments, pre-trained word embedding models may be used by the modeling engine 104, such as but not limited to models formed with Bidirectional Encoder Representations from Transformers (BERT). In some non-limiting embodiments, due to the confidentiality of contract documents, the corpus used to train the model may include historical contracts for a particular entity. Other sources of data may be contract templates from word processing applications or other non-confidential sources that include merge fields for different parameters. In such examples, the values of the parameters for the merge fields may be randomly generated to create synthetic training data. The resulting embedding model may be continually refined as the system 1000 processes additional contract documents. It will be appreciated that a model executed by the modeling engine 104 may be created and trained in various ways from a contract document corpus or other sources of text.

Still referring to FIG. 1, the comparison engine 106 is configured to compare one or more representation vectors generated by the modeling engine 104 to representation vectors in the vector database 110. Various comparison techniques may be used to compare representation vectors based on, for example, a Euclidean distance between two compared vectors. In non-limiting embodiments, clustering techniques (e.g., K-means clustering, K-nearest neighbor clustering, and/or the like) may be used to cluster the representation vectors in the vector database 110 with the one or more representation vectors output by the modeling engine 104. In other examples, distances between different representation vectors in the vector database 110 may be predetermined and stored in the vector database 110 or elsewhere. The comparison engine 106 may output one or more clauses that are similar to the clause being analyzed, based on a distance between a representation vector for the analyzed clause and representation vectors corresponding to one or more other clauses.

In examples in which the representation vectors in the vector database 110 are classified, the comparison engine 106 may assign a classification to the inputted representation vector based on the classification of one or more similar representation vectors. In such non-limiting embodiments, the comparison engine 106 may output a classification and store the classification in the contract database 112 in association with the clause. The classification and corresponding representation vector may also be stored in the vector database 110 for comparison to other vectors in subsequent iterations. In examples in which the representation vectors in the vector database 110 are unclassified, the comparison engine 106 may output a closest representation vector, all representation vectors in the same cluster, and/or the like.

With continued reference to FIG. 1, the parameter extraction engine 108 is configured to extract one or more parameters from a clause. A parameter may include a variable that is associated with a value such as, but not limited to, a contract term (e.g., 5 years, 10 years, etc.), a consideration amount, a party name, a party type (e.g., licensor, licensee, buyer, seller, etc.), a notification period, an expiration date, an item being sold or licensed, and/or the like. FIG. 1 illustrates the parameter extraction engine 108 receiving input from the comparison engine 106, such that the parameters may be identified based on expected parameters in other, similar clauses. For example, one or more parameters may be expected in a particular clause based on one or more parameters associated with other clauses in the same cluster as that clause. It will be appreciated that, in other non-limiting embodiments, the parameter extraction engine 108 may receive input directly from the parsing engine 102 and/or modeling engine 104, and may identify parameters based on an expected pattern, sequence, or context. The extracted parameters may be stored in the contract database 112 in association with the contract document 100 and/or clause from which they were extracted. In some non-limiting embodiments, the extracted parameters may be stored in association with the contract document 100 and/or clause as metadata.

Figure 4A:
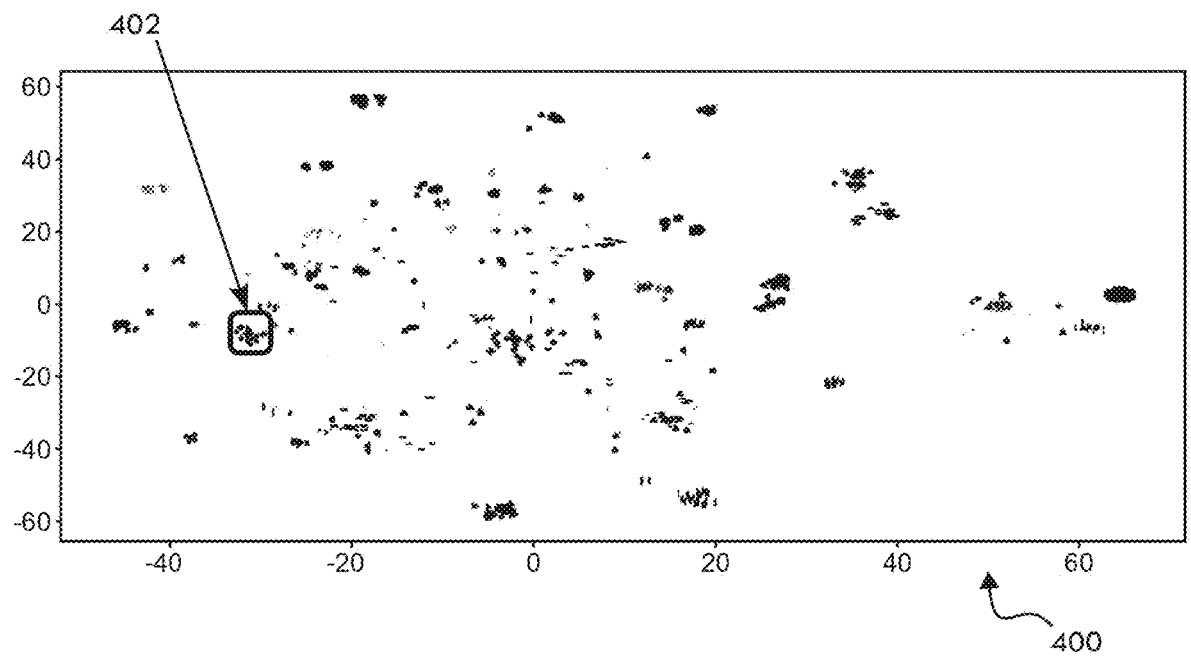
FIG. 4A is a graphical user interface of a cluster visualization according to a non-limiting embodiment.
Figure 4B:
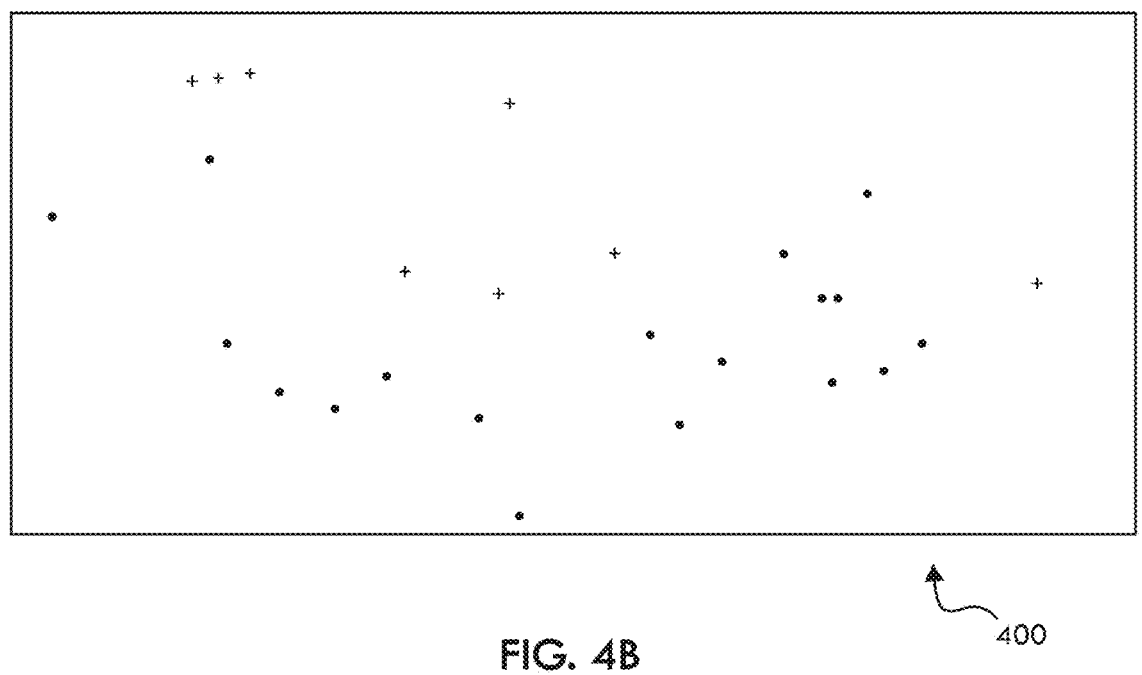
FIG. 4B is an enlarged area of the graphical user interface shown in FIG. 4A.
Figure 5:
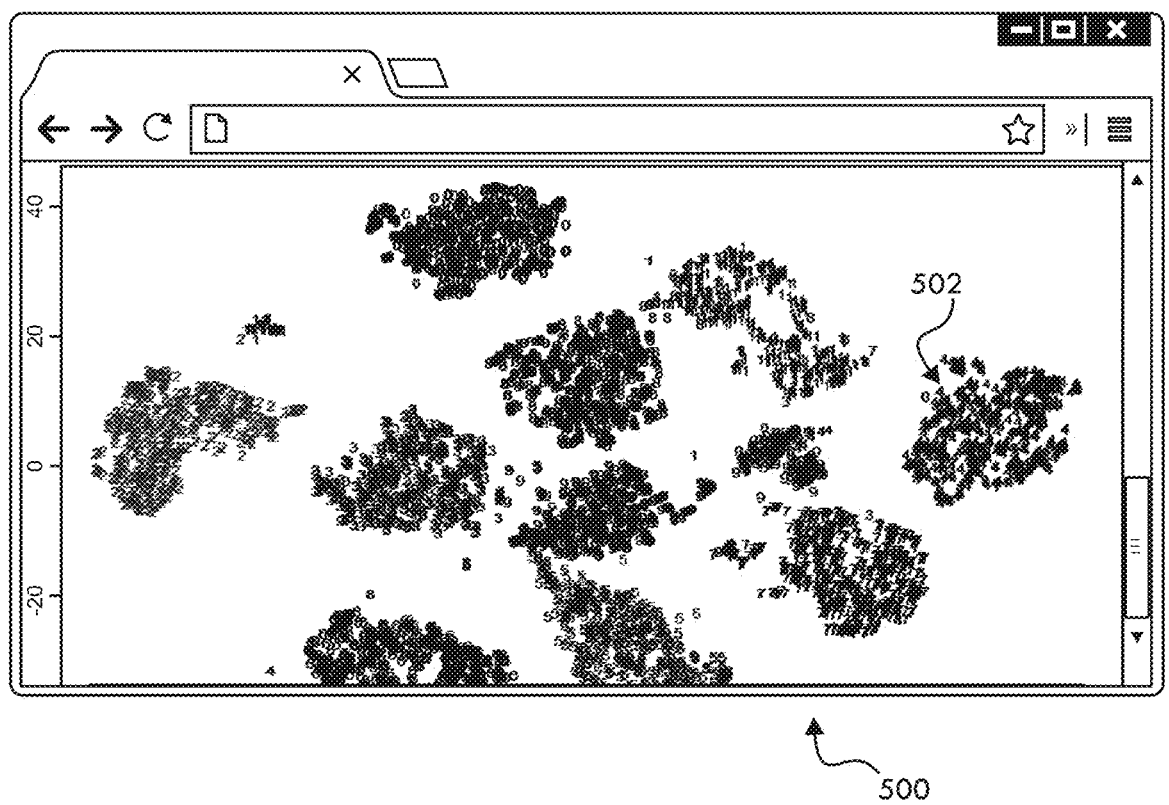
FIG. 5 is a graphical user interface of a cluster visualization according to a non-limiting embodiment.

Still referring to FIG. 1, the visualization engine 105 is configured to visualize a plurality of representation vectors. For example, the visualization engine 105 may visualize clusters of representation vectors from the vector database 110, as clustered by the comparison engine 106, to visually represent one or more distances between a particular representation vector (e.g., corresponding to a particular clause of the contract document 100) and one or more other representation vectors (e.g., corresponding to other clauses from preexisting contract documents). The visualization engine 105 may also allow a user to modify how the representation vectors are visualized (e.g., number of dimensions, color codes, symbology, clustering techniques, and/or the like). Example outputs of the visualization engine 105 are shown in FIG. 4A, FIG. 4B, and FIG. 5, discussed below.

FIG. 1 shows a contract management system 114 as part of the system 1000, although it will be appreciated that the contract management system 114 may also be external to the system 1000 and in communication with the system 1000 through one or more APIs. The contract management system 114 may include any hardware, software, or a combination of hardware and software for managing a plurality of contract documents. As an example, the contract management system 114 may include one or more computing devices with one or more software applications executing thereon for facilitating contract lifecycle management. The contract management system 114 is in communication with the contract database 112 to manage contract documents, search contract documents, and/or the like. It will be appreciated that, in some non-limiting embodiments, the system 1000 may be part of the contract management system 114 such that the functionality of the system 1000 is integrated with and/or provided through the contract management system 114.

Figure 2:
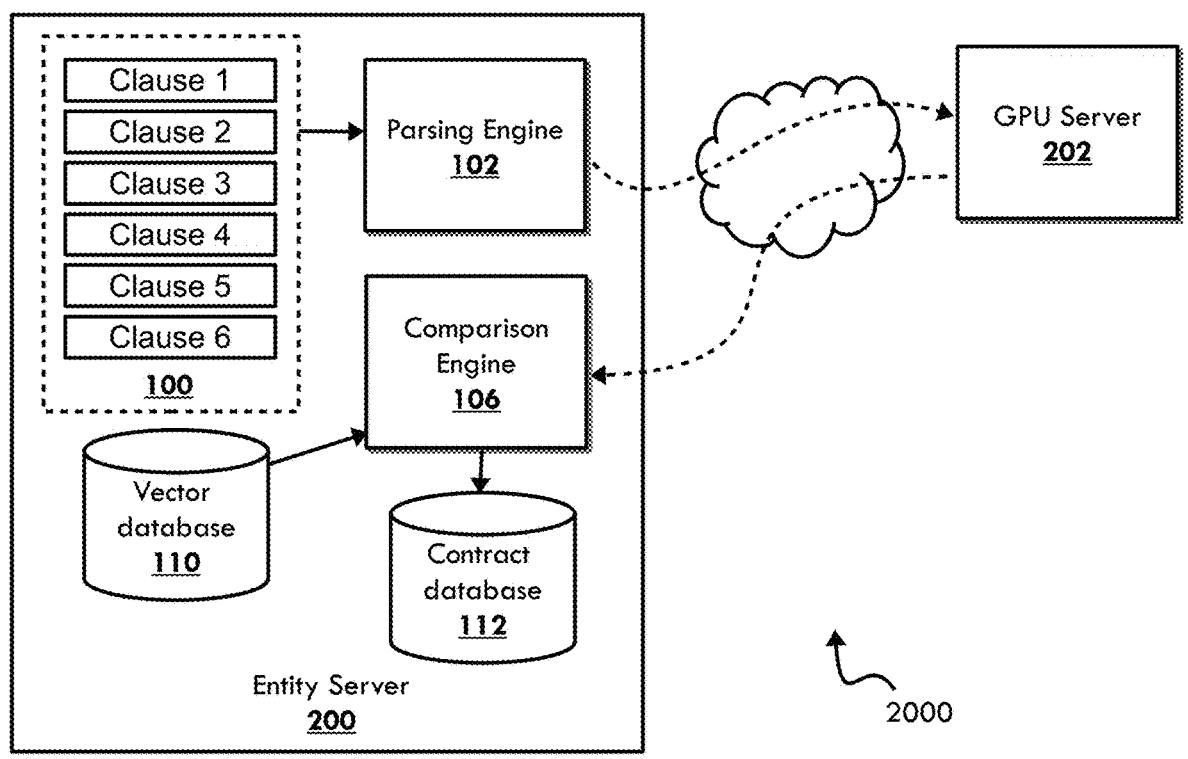
FIG. 2 is a schematic diagram of a system for processing contract documents according to another non-limiting embodiment.

The components of the system 1000 shown in FIG. 1 may be arranged on one or more computing devices, including client and/or server computers. As an example, all of the processing tasks carried out by the system 1000 may or may not be performed by the same device or in the same location. FIG. 2 depicts a system 2000 for processing contract documents according to a non-limiting embodiment in which the clauses are processed into representation vectors by a remote server computer 202. In the illustrated example, the server computer 202 is a Graphics Processing Unit (GPU) server (e.g., one or more computing devices in which each device is equipped with one or more GPUs) configured for deep learning tasks. The server 202 is in communication with an entity server 200.

With continued reference to FIG. 2, the entity server 200 may be a computing device operated by or on behalf of a party to a contract, such as a buyer, seller, licensor, licensee, or the like, or a server that is in communication with such a computing device and that provides functionality to the computing device through one or more web browsers or other client-side applications. In the depicted example, the entity server 200 includes a parsing engine 102 and a comparison engine 106 as described in connection with FIG. 1. The parsing engine 102 parses a contract document 100 to identify clauses (e.g., Clauses 1-6). The parsing engine 102 and/or some other component of the entity server 200 may then communicate the parsed clauses to the GPU server 202. This communication may be performed with a single bulk request including multiple clauses from one or more contracts or, in other examples, may utilize a separate request for each clause. The entity server 200 may communicate requests to the GPU server 202 through one or more APIs, as an example.

With continued reference to FIG. 2, the GPU server 202 may generate representation vectors for the clauses it receives from the entity server 200. For example, the GPU server 202 may include a modeling engine as discussed in relation to FIG. 1. In response to receiving inputted clauses, the GPU server 202 may process the clauses according to the model to generate representation vectors. The GPU server 202 may also communicate the representation vectors to the entity server 200 through one or more APIs or other communication techniques. In the non-limiting embodiment shown in FIG. 2, the GPU server 202 returns one or more representation vectors to the comparison engine 106 to be compared to other representation vectors from the vector database 110. It will be appreciated that, in some non-limiting embodiments, the GPU server 202 may also include the parsing engine 102, comparison engine 106, vector database 110, and/or other components of the system 2000.

Still referring to FIG. 2, in non-limiting embodiments, the modeling engine 104 is located on the remote GPU server 202 for at least training the model. For example, the processing capabilities of the GPU server 202 may be leveraged to process a corpus of text and to develop neural networks for generating embeddings. Once the neural network is trained, however, the modeling engine may be located on the entity server 200 because less computational resources are needed to execute the model once it is already built and trained. In non-limiting examples in which the model is continually refined, rather than being fixed and static after initial training, the model may be maintained on the remote server 202. It will be appreciated that various arrangements are possible and that the modeling engine may be trained and/or located in any location and using any appropriate computing device or combination of computing devices.

In non-limiting embodiments, contract clause parameters may include a contract term, a consideration amount, a payment type (e.g., cash, wire, check, etc.), a party name, a party address, a party type, a notification period, an expiration or termination date, one or more items being sold or licensed, a quantity of items, a start date, an end date, a choice of law, a contract scope, and/or the like. Parameters may also include terms, such as standard terms and conditions, payment terms, confidentiality terms, restrictions, warranty terms, and/or the like. Each parameter may be associated with a value, such as null (e.g., no specific value), a numerical amount, and/or one or more alphanumeric characters.

Formatted contract documents, such as contract documents generated based on a template, may include one or more fields that correspond to one or more parameters. A field may include, for example, a placeholder for a value that corresponds to a parameter. A field may include a blank space, a placeholder, a default value, a delimiter, and/or the like within the body of a contract document clause. Fields may be visually represented in a contract document (e.g., as one or more characters, delimiters, etc.) and/or may be represented via metadata associated with a contract document. Unformatted contract documents that do not include fields may be processed as described herein to identify one or more parameters and to create fields in the contract document or a new contract document to correspond to the identified parameters.

Referring back to FIG. 1, in non-limiting embodiments, a contract document 100 or contract clause from a contract document may be analyzed to identify one or more parameters that correspond to a plurality of predetermined fields. The parameters may be identified by the parsing engine 102, comparison engine 106, and/or parameter extraction engine 108. For example, parameters may be identified by the parsing engine 102 if represented visually in the contract document with one or more characters or delimiters. In other non-limiting embodiments in which the parsing engine 102 is unable to identify the parameters in a clause, the parameters may be identified by the comparison engine 106 and/or parameter extraction engine 108 based on parameters expected to be in the clause based on other, similar clauses.

One or more predetermined fields may be associated with a type of contract document, a type of contract clause, and/or the like. As an example, clauses that are in the same cluster (e.g., clauses corresponding to clustered representation vectors) as a particular clause may be used to determine one or more predetermined parameters in that clause. A "consideration" clause, for example, may be expected to include a consideration amount parameter (e.g., a price or monetary amount). The parameters identified in a processed contract document may be extracted and stored in at least one data structure. In some non-limiting embodiments, a formatted contract document may be generated based on an unformatted input contract document such that the formatted document includes merge fields corresponding to the plurality of predetermined fields.

In non-limiting embodiments, the parameters included in a contract document, including values associated with such parameters, may be associated with the contract document as metadata. The metadata may also identify a particular clause of the contract document in which a parameter is located. In non-limiting embodiments, the contract document and associated metadata may be stored in a database. The system may detect one or more modifications made to the contract document through edits and, in response to detecting such modifications, automatically update the metadata if the value of any parameter is altered. For example, contract documents may be internally edited by a party and, in other cases, may be edited by another party in a negotiation process. Contracts may be edited in real-time while stored in a contract database or, in other examples, may be uploaded with track changes and/or other annotations during a negotiation process.

In non-limiting embodiments, metadata may be used for risk analysis (e.g., transverse analysis, due diligence, etc.), compliance (e.g., comparing invoice data to contract terms), legal operations (e.g., renewal dates and conditions, renegotiation terms, etc.), and performance analysis (e.g., contract lifecycle management), as examples. In non-limiting embodiments, users may specify rules and/or conditions for risk analysis. As an example, a user may specify rules that cause an alert or notification to be generated in response to a parameter deviating more than a specified percentage or value, inclusion or exclusion of a particular clause or term, and/or the like. In non-limiting embodiments, the metadata may also be used for compliance by comparing contract parameters, cross-referencing other sources of data (e.g., supplier records).

Figure 3:
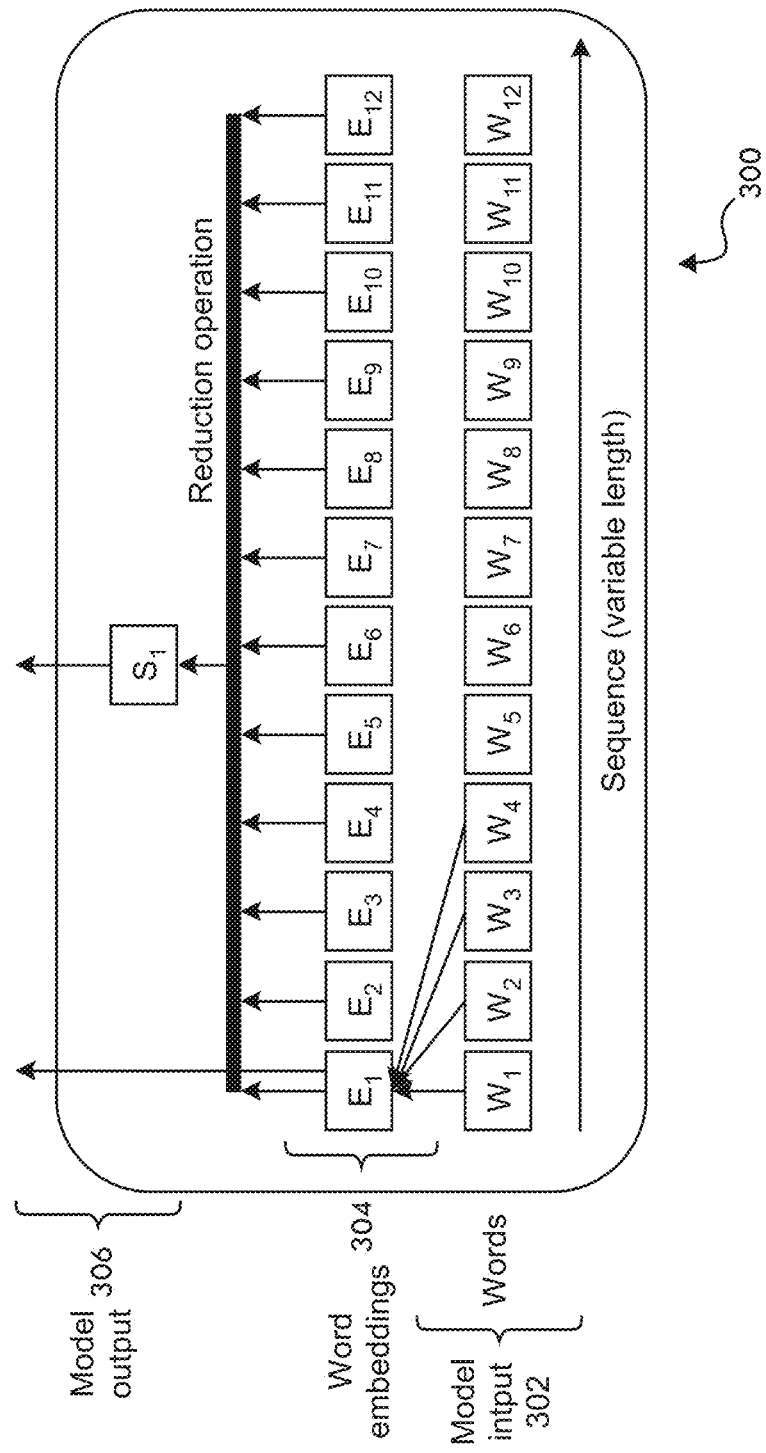
FIG. 3 is a diagram of an embedding model according to a non-limiting embodiment.

FIG. 3 illustrates a sentence embedding model according to non-limiting embodiments. As shown, a sequence of words (W1-W12) are used to create a sequence of word embeddings (E1-E12). The word embedding model used to create the word embeddings may be based on context such that the embedding E1 for a first word W1 is based on the first word W1 and the context of the first word W1 (e.g., W2, W3, W4, etc.). The word embeddings (E1-E12) and the resulting model may be generated from a training corpus of text including, but not limited to, a plurality of contract documents, news articles, webpages, and/or any other like text. The series of word embeddings E1-E12 may then be reduced to a sentence embedding S1 through a reduction operation. The reduction operation may be the result of processing the sequence of word embeddings from a corpus of contract documents or other text with, for example, a neural network, to develop a trained model. The sentence embedding S1 and word embeddings E1-E12 may be represented by one or more representation vectors having any number of dimensions. In non-limiting embodiments, each clause may be reduced to one or more sentence embeddings.

In non-limiting embodiments, the embedding model is a pre-trained neural network developed using a corpus of text, including but not limited to a plurality of contract documents, clauses, news articles, webpages, and/or any other like text. The embedding model may be continually trained as the system is utilized or, in other examples, may be fixed once the embedding model is trained. In some non-limiting embodiments, multilingual embeddings may be utilized such that the same embeddings may be used for contract documents in multiple languages. Multilingual embeddings are dependent on the language of a sentence or clause. In some non-limiting embodiments, cross-lingual embeddings may be utilized such that words from different languages having the same meaning have similar embeddings (e.g., representation vectors having a distance less than a threshold value). Cross-lingual embeddings may be independent of the language. In non-limiting embodiments, a first language is detected in a clause of an inputted contract document. The clause is then inputted to a cross-lingual or multilingual embedding model to generate a cross-lingual or multilingual embedding.

In non-limiting embodiments, the comparison of representation vectors may be evaluated based on an unsupervised metric that does not require any labels or ground truth data. For example, the metric may be a percentage of character matches based on a semantic differential. The metric may increase each time a closer (i.e., shorter distance) clause is found. Such a metric may be used to evaluate the quality of the embedding model and/or algorithms for parsing contract documents, classifying clauses, and/or the like.

A contract document may include clause titles (e.g., headings or other visual labels) associated with one or more clauses. In some non-limiting embodiments, a contract document may have one or more clauses without titles, one or more clauses with titles, and/or the like. Some clause titles may frequently appear in contract documents (e.g., preamble, consideration, definitions, notice requirements, warranties, etc.), whereas other clause titles may appear less frequently. Moreover, a corpus of existing contract documents or other text may or may not include clause titles. In some examples, contract documents may include clause titles for every clause or some clauses, while other contract documents may not include any clause titles. Titles may, in some examples, be bolded, underlined, italicized, and/or identified by a letter or number. In some examples, titles may be identified by being off-set from clauses, punctuation, and/or context.

In non-limiting embodiments, the body of a clause (e.g., one or more sentences in the clause, excluding a title) is modeled to generate a representation vector separately from the clause title. In such examples, the clause titles may be excluded from the processing of the contract document and/or be separately processed to generate separate representation vectors for the clause titles. In non-limiting embodiments in which the clause titles are separately modeled, a separate embedding model may be created and trained using clause titles from a corpus of text documents. Once the model is created and trained, it may be used to generate representation vectors for the clause titles that can be compared to determine one or more distances between the vectors. In other non-limiting embodiments, the clause titles may be combined with the clause bodies for generating a representation vector that represents both the title and the clause.

In non-limiting embodiments, a clause title in a contract document may be replaced with a predetermined clause title associated with other clauses that are clustered with and/or within a threshold distance of the clause corresponding to the title. For example, it may be determined that a clause corresponding to a particular title is clustered with other clauses that are associated with the title "warranties." Thus, the title "warranties" may be inserted into the contract document if there is no existing title, may replace an existing title in the contract document, may be associated with the contract document as metadata or an annotation, and/or the like. Likewise, it may be determined that a particular clause title is clustered with other clause titles where the title "warranties" is the most common in the cluster and, as a result, the clause title may be replaced with "warranties" if it does not already match. It will be appreciated that other variations are possible.

In non-limiting embodiments, the clustered clause titles may be used to verify clustering and/or classification of corresponding clauses. In this manner, the clause titles may be used as a ground truth to evaluate the quality of the sentence embeddings and/or clause embeddings. For example, clustering the clauses and clustering the clause titles separately allow for a determination of whether the clustered clause titles correspond to the same clustered clauses. In response to determining that a particular clause title for a particular clause is clustered with clause titles that do not correspond to clauses that are clustered with the particular clause, it can be further determined that an anomaly or error is present in the particular clause and/or clause title. In response to a detected possible anomaly or error, the clause may be flagged for further analysis or review.

FIG. 4A shows a cluster visualization GUI 400 according to a non-limiting embodiment. As shown, different categories of clauses are represented by different symbols (e.g., different shapes, different characters, different colors, and/or the like). The cluster visualization may be generated with any technique or system including, for example, through the use of t-Distributed Stochastic Neighbor Embedding (t-SNE) to represent the relationship between different representation vectors in two or three dimensions. Various tools and applications may be utilized to facilitate user interactivity with the cluster representation, such as zooming in or out, altering one or more cluster parameters, changing symbology, viewing in different dimensions, and/or the like.

FIG. 4B shows an enlarged area 402 of the cluster visualization GUI shown in FIG. 4A. The circle symbols represent clauses that are titled "incessibilité du contrat" while clauses in crosses represent clauses that are titled "incessibilité du contrat cadre". Based on the proximity between these clauses (e.g., distance between representation vectors), it can be determined that the clauses represented by the circle symbols and the cross symbols are similar or partially duplicative, even though the titles may semantically differ. For example, two clauses in a contract document may have a close distance (e.g., less than a predetermined threshold) when clustered, despite being in different clusters. A first clause, for example, may be close in distance to and/or clustered with clauses relating to pricing, and a second clause, for example may be close in distance to and/or clustered with clauses relating to licensing. Because these categories have a close distance (e.g., within a predetermined threshold), it may be determined that the clauses should have a single classification (e.g., pricing/licensing).

FIG. 5 shows a cluster visualization GUI 500 according to a non-limiting embodiment. In the GUI 500 shown in FIG. 5, the clauses are represented by numerals (0-9) as symbols. The symbols may also be color coded. From the example shown in FIG. 5, it can be seen that there are several anomalies or deviations in the clusters. For example, symbol 502 is the numeral "0" that is clustered with symbols represented by the numeral "4." It can therefore be determined that the clause corresponding to symbol 502 may be similar to the clauses it is clustered with. Because the cluster of "0" symbols is a significant distance from the cluster of "4" symbols, it may be determined that the clause corresponding to symbol 502 should be flagged for further analysis or review.

Figure 6:
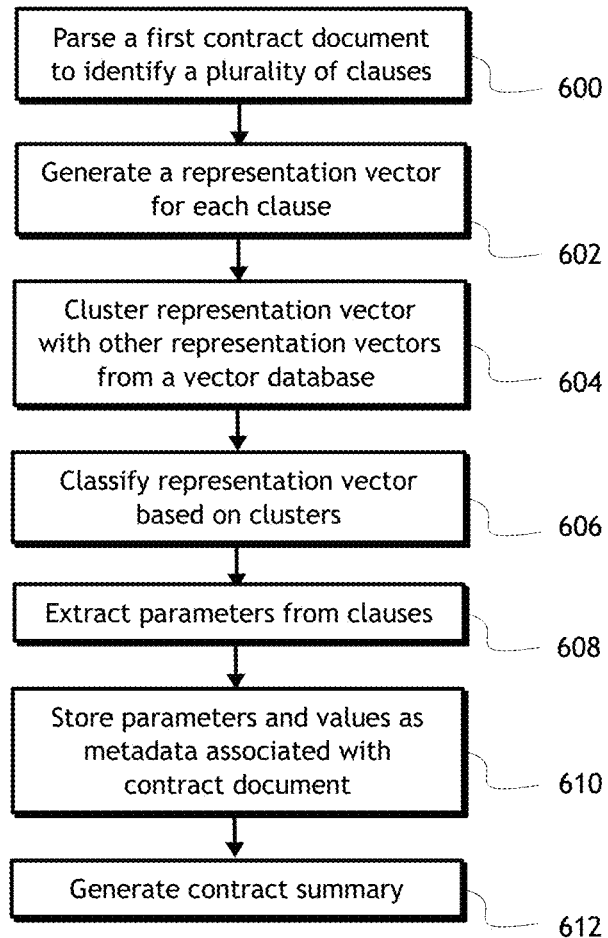
FIG. 6 is a flow diagram for a system and method for processing contract documents according to a non-limiting embodiment.
Figure 7:
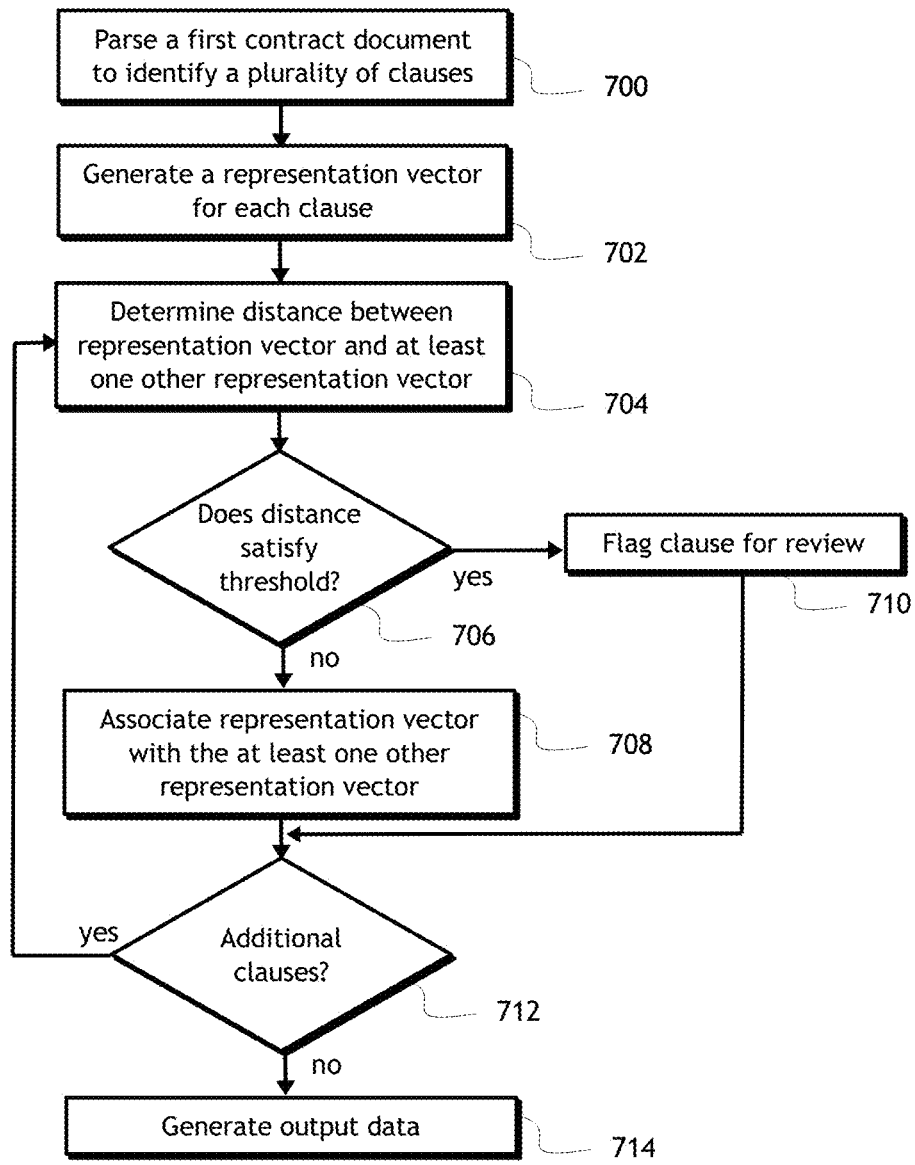
FIG. 7 is a flow diagram for a system and method for processing contract documents according to another non-limiting embodiment.

Referring now to FIGS. 6 and 7, flow diagrams are shown for methods for processing contract documents according to non-limiting embodiments. It will be appreciated that the flow diagrams are shown for exemplary purposes only and that the methods may include fewer, additional, and/or different steps, and that the steps may be performed in any order.

Referring to FIG. 6, a first contract document is parsed at step 600 to identify a plurality of clauses in the contract document. Various techniques may be used to parse the contract document, as discussed herein. At step 602, a representation vector is generated for each clause outputted by step 600. At step 604, the representation vector is clustered with other representation vectors from a vector database. The other representation vectors in the vector database may be classified or unclassified. At step 606, the representation vector is classified. For example, the representation vector may be classified based on a classification of at least one other representation vector in the same cluster and/or within a threshold distance. As explained herein, in some non-limiting embodiments, the representation vector may not be classified and, instead, may be compared to other representation vectors and associated with representation vectors that are within a threshold distance to determine if the representation vector is anomalous, erroneous, and/or should be flagged for additional analysis and review.

With continued reference to FIG. 6, at step 608, parameters and corresponding parameter values may be extracted from the clauses. For example, the clause may be analyzed for predetermined parameters that are expected for clauses in the same classification and/or cluster. The parameters may be identified based on a format of characters, delimiters, expected placement, and/or the like. As an example, the parameter "consideration amount" may be extracted along with the value of $1,000. It will be appreciated that the parameter name (e.g., "consideration amount") may not actually appear in the language of the clause, but instead may be a predetermined parameter name, represented in the contract document by a value, that is used by the system and users for identification purposes. At step 610, the parameters and the corresponding values are stored as metadata associated with the contract document. At step 612, a contract summary is generated based on the contract document, the parameters and values, and/or the comparison of the representation vectors. The contract summary may flag (e.g., highlight, excerpt, identify, etc.) clauses or parameters in the contract document for further review. The contract summary may also list the parameters and corresponding values, including deviations or anomalies from what is expected and/or part of a predetermined template.

Referring to FIG. 7, a flow diagram is shown for a method for processing contract documents according to another non-limiting embodiment. A first contract document is parsed at step 700 to identify a plurality of clauses in the contract document. Various techniques may be used to parse the contract document, as discussed herein. At step 702, a representation vector is generated for each clause outputted by step 700. At step 704, for a first clause of a plurality of clauses, a distance is determined between the representation vector corresponding to the first clause and at least one other representation vector from a vector database. For example, the distance determination may include a clustering algorithm, a plurality of separate distance calculations, and/or the like.

With continued reference to FIG. 7, at step 706, it is determined whether the distance between the representation vector for the first clause and at least one other representation vector satisfies a threshold (e.g., meets, is equal to, and/or exceeds a threshold value). For example, it may be determined during a cluster analysis that the representation vector is not sufficiently close in distance to any particular cluster, is an outlier in a cluster, or the like. If the distance does satisfy a threshold, the method may proceed to step 710 and the first clause may be flagged for review. As an example, the first clause may be annotated, included in a contract summary, or identified in any way for further analysis and review. If the clause does not satisfy a threshold, the method proceeds to step 708 and the representation vector for the first clause is associated with at least one other representation vector. For example, the representation vector may be associated with a cluster of other representation vectors, the representation vector may be classified in accordance with representation vectors within a threshold distance from it, and/or the like.

Still referring to FIG. 7, at step 712 it is determined whether there are additional clauses to process. If there are additional clauses, the method may proceed back to step 704 to process a next clause. If there are no additional clauses to process, the method may proceed to step 714 in which output data is generated. As described herein, the output data may include a contract summary, an annotated contract document, a modified contract document with one or more new parameters, a modified contract document with one or more new clauses, risk assessment data, a data structure representing a plurality of extracted parameters, a structured contract document based on the first contract document and including merge fields corresponding to a plurality of predetermined fields, metadata to be associated with the first contract document, and/or the like.

In non-limiting embodiments, the system may output common clauses from multiple contract documents. This may facilitate the review of multiple contracts by separately identifying clauses that can be reviewed together and/or match to a predetermined format. The system may also output clauses from a particular contract document that are clustered with or within a threshold distance of clauses that are predetermined or otherwise expected. In non-limiting embodiments, the system may output unique clauses that do not match any particular cluster and/or are not within a threshold distance of clauses that are predetermined or otherwise expected. This output may facilitate the identification and review of clauses that may be anomalous, erroneous, problematic, or unexpected.

In non-limiting embodiments, the system may output an annotated contract document based on the input contract document and a comparison of representation vectors. For example, in non-limiting embodiments in which one or more clauses of a contract document are classified, an annotated contract document may identify differently classified clauses with different colors, highlighting, mark-ups (e.g., underlines, strike-throughs, red-line changes, etc.), comments, and/or the like. In this manner, a contract document may be segmented into different clauses even if those clauses are not initially set apart or separately identified.

In non-limiting embodiments, the system may output a contract summary. Typically, an individual that approved the contract knows the terms of the agreement, but not the other people who will work on an associated project or order. A contract summary may identify one or more clauses that may be important for detailed review. For example, if a predetermined value for a parameter for a limitation on liability is $50,000 (e.g., as determined from a template or a common value in other contract documents), a contract summary may highlight a proposed contract clause that limits the liability at $75,000. Deviations of parameter values that satisfy a predetermined threshold value, or deviate by more than a predetermined threshold percentage, may be listed in a contract summary.

In non-limiting embodiments, natural language processing techniques may be utilized to process questions inputted by users about a particular clause or contract document. For example, a linear regression model may be developed based on the word embeddings and/or sentence embeddings to enable automatic determinations of answers to inputted questions. As an example, a question may ask for a value of a parameter (entity name, entity address, type of contract, consideration amount, applicable law, etc.). The system may utilize metadata associated with the contract document, including values of parameters, to generate a response to a question. Questions may also be directed to a plurality of contracts. As another example, a user may ask how many contracts include an indemnity clause with obligations exceeding $20,000.

Figure 8:
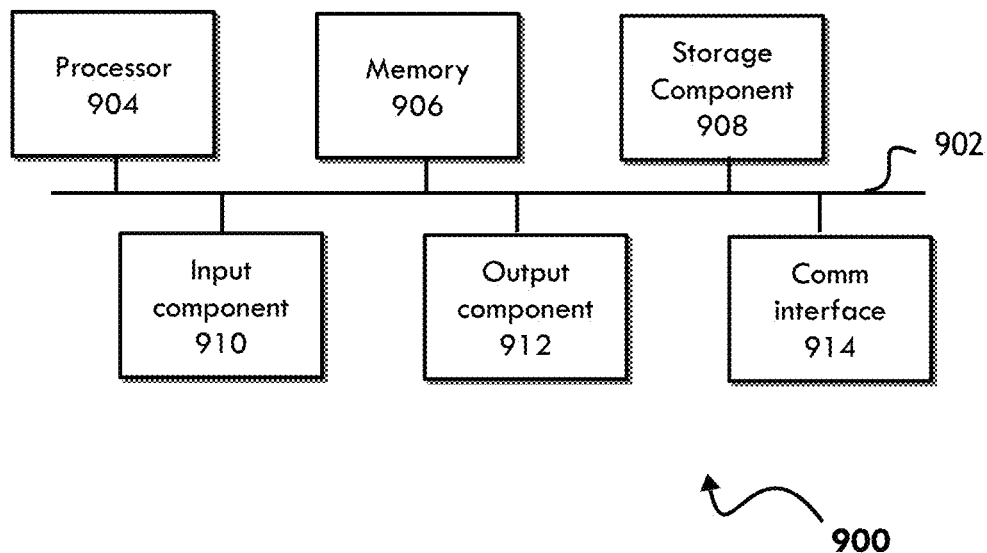
FIG. 8 illustrates example components of a device used in connection with non-limiting embodiments.

Referring now to FIG. 8, shown is a diagram of example components of a device 900 according to non-limiting embodiments. Device 900 may correspond to the entity server 200, GPU server 202, parsing engine 102, modeling engine 104, comparison engine 106, visualization engine 105, parameter extraction engine 108, and/or contract management system 114, as shown in FIGS. 1 and 2, as examples. In some non-limiting embodiments, such systems or devices may include at least one device 900 and/or at least one component of device 900. The number and arrangement of components shown in FIG. 8 are provided as an example. In some non-limiting embodiments, device 900 may include additional components, fewer components, different components, or differently arranged components than those shown in FIGS. 1 and 2. Additionally, or alternatively, a set of components (e.g., one or more components) of device 900 may perform one or more functions described as being performed by another set of components of device 900.

As shown in FIG. 8, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 8, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although non-limiting embodiments have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for processing a plurality of contract documents having different formats and clauses, comprising:
    parsing, with at least one processor, a first contract document to identify a plurality of clauses in the first contract document, each clause of the plurality of clauses comprising a sequence of words;
    generating, with at least one processor, a plurality of representation vectors based on the first contract document and at least one embedding model, wherein each representation vector of the plurality of representation vectors is generated based on a separate clause of at least a subset of clauses of the plurality of clauses;
    comparing, with at least one processor, each representation vector of the plurality of representation vectors with a second plurality of representation vectors stored in a vector database in order to generate output data based on the second plurality of representation vectors using the comparison with the representation vectors of the first contract document,
    identifying a plurality of parameters in the first contract document that corresponds to a plurality of predetermined fields based on comparing clauses corresponding to representation vectors clustered together in order to generate at least one data structure representing the identified plurality of parameters from the first contract document;
    wherein the output data comprises:
    the at least one data structure representing the identified plurality of parameters extracted from the clauses from the first contract document;
    a structured contract document based on the first contract document and comprising merge fields corresponding to the plurality of predetermined fields,
    and wherein the parameters in the data structure correspond with the merge fields in the structured contract document.

2. The computer-implemented method of claim 1, wherein the second plurality of representation vectors is unclassified, the method further comprising:
    detecting, with at least one processor, a parameter in a clause of the plurality of clauses that differs by more than a threshold from at least one other parameter in at least one other clause corresponding to a representation vector clustered with a representation vector corresponding to the clause, wherein the output data comprises at least one of the following: a new parameter replacing the parameter, a new clause replacing the clause, an annotation identifying the parameter, an annotation identifying the clause, risk assessment data based on the parameter, or any combination thereof.

3. The computer-implemented method of claim 1, wherein the output data comprises the at least one data structure representing the plurality of parameters, further comprising:
    storing the output data as metadata associated with the first contract document;
    detecting, with at least one processor, a modification to the first contract document; and in response to detecting the modification, automatically updating the metadata associated with the first contract document based on the modification.

4. The computer-implemented method of claim 1, further comprising:
determining, with at least one processor, a classification for each clause of the plurality of clauses based on a classification associated with at least one other clause corresponding to at least one representation vector clustered with a representation vector corresponding to the clause, wherein each classification corresponds to a clause category.

5. The computer-implemented method of claim 1, wherein generating each representation vector comprises:
detecting a first language of a clause of the first contract document; and
generating at least one cross-lingual or multilingual embedding for the clause based on a linguistics embedding model.

6. The computer-implemented method of claim 1, further comprising parsing, with at least one processor, the first contract document to identify a plurality of clause titles, wherein the plurality of clause titles is independent of the plurality of clauses.

7. The computer-implemented method of claim 6, further comprising:
generating, with at least one processor, a plurality of title representation vectors based on the plurality of clause titles, wherein each title representation vector of the plurality of title representation vectors is generated based on a separate clause title in the first contract document;
clustering, with at least one processor, each title representation vector of the plurality of title representation vectors with a second plurality of title representation vectors stored in the vector database; and
verifying, with at least one processor, the clustering of the plurality of representation vectors corresponding to the plurality of clauses based on comparing clusters for the plurality of representation vectors to clusters for the plurality of title representation vectors.

8. The computer-implemented method of claim 1, further comprising determining, with at least one processor, that a clause of the plurality of clauses lacks a corresponding title or corresponds to an incorrect title, wherein the output data comprises a new title for the clause based on at least one title associated with at least one other clause corresponding to at least one representation vector clustered with a representation vector corresponding to the clause.

9. The computer-implemented method of claim 1, wherein the output data comprises at least one of the following: an annotated version of the first contract document, a summary of the first contract document, a second contract document generated based on a predetermined template, a second contract document including at least one new clause replacing at least one clause of the plurality of clauses, or any combination thereof.

10. The computer-implemented method of claim 1, wherein clustering each representation vector of the first contract document comprises determining a distance between the representation vector and at least one representation of the second plurality of representation vectors.

11. A system for processing a plurality of contract documents having different formats and clauses, comprising at least one processor programmed or configured to:

parse a first contract document to identify a plurality of clauses in the first contract document, each clause of the plurality of clauses comprising a sequence of words;
generate a plurality of representation vectors based on the first contract document and at least one embedding model, wherein each representation vector of the plurality of representation vectors is generated based on a separate clause of at least a subset of clauses of the plurality of clauses;
compare each representation vector of the plurality of representation vectors with a second plurality of representation vectors stored in a vector database in order to
generate output data based on the second plurality of representation vectors using the comparison with the representation vectors of the first contract document;
identify a plurality of parameters in the first contract document that correspond to a plurality of predetermined fields based on comparing clauses corresponding to representation vectors clustered together in order to generate at least one data structure representing the identified plurality of parameters extracted from the clauses from the first contract document;
wherein the output data comprises:
the at least one data structure representing the identified plurality of parameters extracted from the clauses from the first contract document;
a structured contract document based on the first contract document and comprising merge fields corresponding to the plurality of predetermined fields;
and wherein the parameters in the data structure correspond with the merge fields in the structured contract document.

12. The system of claim 11, wherein the second plurality of representation vectors is unclassified, and wherein the at least one processor is further programmed or configured to detect a parameter in a clause of the plurality of clauses that differs by more than a threshold from at least one other parameter in at least one other clause corresponding to a representation vector clustered with a representation vector corresponding to the clause, wherein the output data comprises at least one of the following: a new parameter replacing the parameter, a new clause replacing the clause, an annotation identifying the parameter, an annotation identifying the clause, risk assessment data based on the parameter, or any combination thereof.

13. The system of claim 11, wherein the output data comprises the at least one data structure representing the plurality of parameters, and wherein the at least one processor is further programmed or configured to:
store the output data as metadata associated with the first contract document;
detect a modification to the first contract document; and
in response to detecting the modification, automatically update the metadata associated with the first contract document based on the modification.

14. The system of claim 11, wherein the at least one processor is further programmed or configured to determine a classification for each clause of the plurality of clauses based on a classification associated with at least one other clause corresponding to at least one representation vector clustered with a representation vector corresponding to the clause, wherein each classification corresponds to a clause category.

15. The system of claim 11, wherein generating each representation vector comprises:

detecting a first language of a clause of the first contract document; and generating at least one cross-lingual or multilingual embedding for the clause based on a linguistics embedding model.

16. The system of claim 11, wherein the at least one processor is further programmed or configured to parse the first contract document to identify a plurality of clause titles, wherein the plurality of clause titles is independent of the plurality of clauses.

17. The system of claim 16, wherein the at least one processor is further programmed or configured to:

generate a plurality of title representation vectors based on the plurality of clause titles, wherein each title representation vector of the plurality of title representation vectors is generated based on a separate clause title in the first contract document;

cluster each title representation vector of the plurality of title representation vectors with a second plurality of title representation vectors stored in the vector database; and verify the clustering of the plurality of representation vectors corresponding to the plurality of clauses based on comparing clusters for the plurality of representation vectors to clusters for the plurality of title representation vectors.

18. The system of claim 11, wherein the at least one processor is further programmed or configured to determine that a clause of the plurality of clauses lacks a corresponding title or corresponds to an incorrect title, wherein the output data comprises a new title for the clause based on at least one title associated with at least one other clause corresponding to at least one representation vector clustered with a representation vector corresponding to the clause.

19. The system of claim 11, wherein the output data comprises at least one of the following: an annotated version of the first contract document, a summary of the first contract document, a second contract document generated based on a predetermined template, a second contract document including at least one new clause replacing at least one clause of the plurality of clauses, or any combination thereof.

20. The system of claim 11, wherein the clustering of each representation vector of the first contract document comprises determining a distance between the representation vector and at least one representation of the second plurality of representation vectors.

21. A computer program product for processing a plurality of contract documents having different formats and clauses, comprising at least one non-transitory computer-readable medium including program instructions that, when executed by at least one processor, cause the at least one processor to:

parse a first contract document to identify a plurality of clauses in the first contract document, each clause of the plurality of clauses comprising a sequence of words;

generate a plurality of representation vectors based on the first contract document and at least one embedding model, wherein each representation vector of the plurality of representation vectors is generated based on a separate clause of at least a subset of clauses of the plurality of clauses;

compare each representation vector of the plurality of representation vectors with a second plurality of representation vectors stored in a vector database in order to generate output data based on the second plurality of representation vectors using the comparison with the representation vectors of the first contract document;

identify a plurality of parameters in the first contract document that correspond to a plurality of predetermined fields based on comparing clauses corresponding to the representation vectors clustered together in order to generate at least one data structure representing the plurality of identified parameters extracted from clauses from the first contract document;

wherein the output data comprises:

the at least one data structure representing the plurality of identified parameters extracted from clauses from the first contract document;

a structured contract document based on the first contract document and comprising merge fields corresponding to the plurality of predetermined fields;

and wherein the parameters in the data structure correspond with the merge fields in the structured contract document.

* * * * *